(12) United States Patent
Kim et al.

(10) Patent No.: US 11,643,568 B2
(45) Date of Patent: May 9, 2023

(54) COPPER NANOPARTICLE AND PREPARATION METHOD THEREFOR

(71) Applicant: Research & Business Foundation Sungkyunkwan University, Suwon-si (KR)

(72) Inventors: Sung-wng Kim, Seoul (KR); Kyu-hyoung Lee, Seoul (KR); Ye-ji Kim, Suwon-si (KR); Jong-Ho Park, Cheongju-si (KR); Seung-yong Lee, Bucheon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 638 days.

(21) Appl. No.: 16/612,318

(22) PCT Filed: Mar. 7, 2018

(86) PCT No.: PCT/KR2018/002708
§ 371 (c)(1),
(2) Date: Feb. 7, 2020

(87) PCT Pub. No.: WO2018/164479
PCT Pub. Date: Sep. 13, 2018

(65) Prior Publication Data
US 2020/0164442 A1    May 28, 2020

(30) Foreign Application Priority Data

Mar. 9, 2017 (KR) .................. KR10-2017-0029985
Nov. 15, 2017 (KR) .................. KR10-2017-0152657
Feb. 9, 2018 (KR) .................. KR10-2018-0016493

(51) Int. Cl.
*B22F 9/24* (2006.01)
*B22F 1/054* (2022.01)
(Continued)

(52) U.S. Cl.
CPC ............... *C09D 11/52* (2013.01); *B01J 27/22* (2013.01); *B01J 27/24* (2013.01); *B22F 1/054* (2022.01);
(Continued)

(58) Field of Classification Search
CPC ....................................................... B22F 9/24
(Continued)

(56) References Cited

U.S. PATENT DOCUMENTS 5,453,297 A * 9/1995 Dye .......................... B22F 9/24
                                                    427/217
7,935,170 B2   5/2011 Jun et al.
(Continued)

FOREIGN PATENT DOCUMENTS

JP    2011-74476 A    4/2011
JP    2014-24712 A    2/2014
(Continued)

OTHER PUBLICATIONS

JP2011-074476A English language translation (Year: 2011).*
(Continued)

*Primary Examiner* — Anthony J Zimmer
*Assistant Examiner* — Sean P. O'Keefe
(74) *Attorney, Agent, or Firm* — NSIP Law

(57) ABSTRACT

The present invention relates to a low-temperature sinterable copper particle material prepared using an electride and an organic copper compound and a preparation method therefor and, more particularly, to a copper nanoparticle which can be useful as a conductive copper ink material thanks to its small size and high dispersibility, and a method for preparing the copper nanoparticle by reducing an organic copper compound with an electride as a reducing agent. The present invention provides copper nanoparticles which can be suitably used as a conductive copper nanoink material because (Continued)

the copper nanoparticles show the restrained oxidation of the copper, have an average particle diameter of around 5 nm to cause the depression of melting point, are of high dispersibility, and allow the removal of the electride in a simple ultrasonication process. The prepared copper nanoparticles can be useful as an oxidation preventing protector or conductive copper ink material which is small in particle size and high in dispersibility.

11 Claims, 12 Drawing Sheets

(51) Int. Cl.
   *B22F 1/065*   (2022.01)
   *C09D 11/52*   (2014.01)
   *B01J 27/24*   (2006.01)
   *B01J 27/22*   (2006.01)
   *C09K 15/02*   (2006.01)
   *B22F 1/10*   (2022.01)

(52) U.S. Cl.
   CPC ............... *B22F 1/065* (2022.01); *B22F 1/10* (2022.01); *B22F 9/24* (2013.01); *C09K 15/02* (2013.01); *B22F 2201/20* (2013.01); *B22F 2301/10* (2013.01); *B22F 2304/054* (2013.01)

(58) Field of Classification Search
   USPC .......................................................... 75/373
   See application file for complete search history.

(56) References Cited

U.S. PATENT DOCUMENTS

| | | | |
|---|---|---|---|
| 2008/0011125 A1* | 1/2008 | Shirata ..................... | B22F 9/24 75/255 |
| 2008/0072706 A1* | 3/2008 | Lee ........................... | B22F 9/24 977/777 |
| 2008/0138643 A1 | 6/2008 | Lee et al. | |
| 2016/0361712 A1 | 12/2016 | Hosono et al. | |
| 2017/0073538 A1 | 3/2017 | Kawasaki et al. | |
| 2020/0165130 A1* | 5/2020 | Warren ..................... | H01B 1/06 |

FOREIGN PATENT DOCUMENTS

| | | |
|---|---|---|
| KR | 10-0814295 B1 | 3/2008 |
| KR | 10-2009-0032839 A | 4/2009 |
| KR | 10-1323098 B1 | 10/2013 |
| KR | 10-2016-0126989 A | 11/2016 |

OTHER PUBLICATIONS

Zhang, Xiao, et al. "Two-dimensional transition-metal electride Y2C." Chemistry of Materials 26.22 (2014): 6638-6643 (Year: 2014).*

Zhang, Yunwei, et al., "Computer-Assisted Inverse Design of Inorganic Electrides," *Physical Review X*, vol. 7, Issue 1, Jan.-Mar. 2017 (pp. 011017-1-011017-11), published Feb. 14, 2017, corrected Feb. 23, 2017.

International Search Report dated Jul. 4, 2018, in counterpart International Application No. PCT/KR2018/002708 (2 pages in English and 3 pages in Korean).

Written Opinion of the International Searching Authority dated Jul. 4, 2018, in counterpart International Application No. PCT/KR2018/002708 (12 pages in English and 9 pages in Korean).

* cited by examiner

COPPER NANOPARTICLE AND PREPARATION METHOD THEREFOR

TECHNICAL FIELD

The present invention relates to copper nanoparticles and a method of manufacturing the same, and more particularly to a low-temperature sinterable copper particle material manufactured using an electride and an organic copper compound and a method for manufacturing the same.

BACKGROUND ART

There is a growing interest in an electride that contains electrons in completely different states from those of conventional materials. An electride is a new concept of material in which electrons exist as interstitial electrons in an empty space inside a crystal, rather than around an atomic nucleus, and directly determine the functionality of a material regardless of constituent elements and structural factors.

An electride is a material which can be used as an electron-emitting material due to a low work function thereof, which can be used as a magnetic material (light magnetic material, magnetic heat material, etc.) due to high magnetic entropy variation thereof, and which can be widely used as a catalyst material due to high electron transfer efficiency thereof.

Electrides are divided into organic electrides and inorganic electrides. Organic electrides that have been developed to date are unstable at room temperature and thus cannot be applied as an electronic material. A representative example of inorganic electrides stable at room temperature is C12A7, i.e., $12CaO.7Al_2O_3$, developed in the year 2003. In recent years, Tokyo Institute of Technology in Japan has developed a nitride electride (AE3N) and filed a patent application for the same (JP 2014-024712, JP 2012-166325). In Korea, the Korea Ceramic Institute of Technology has filed a patent application for C12A7 (KR 2013-0040232, etc.). However, inorganic electrides containing other components have not yet been reported.

In addition, the electride is a material having electrons in a specific space inside a crystal, which is completely different from a conventional stoichiometric material concept, and it is difficult to design and compound a composition that can be embodied as the electride. Furthermore, physical properties of the electride are sensitively changed depending on constituent elements and structural characteristics thereof, and therefore there are also technical limitations in predicting functional characteristics thereof, whereby research cases to date are very rare.

Since metal nanoparticles having a diameter of 100 nm or less exhibit different properties from bulk metals in terms of various physical properties thereof (thermal, magnetic, and electrical properties), application thereof to various technical fields is expected. For example, there is research to manufacture an electronic circuit composed of fine metal wiring on a substrate by making fine wiring printing ink from metal nanoparticles using characteristics thereof that the surface area thereof increases and the melting point thereof decreases as the particles thereof become smaller.

Silver nanoparticles are mainly used as the fine wiring ink material. However, silver nanoparticles have a disadvantage in that silver in the fine wiring is oxidized, whereby a migration phenomenon easily occurs. Gold is suitable due to low migration thereof, but it is expensive. Therefore, copper, which exhibits lower migration than silver and which is relatively inexpensive, has attracted attention as a metal used for fine wiring printing ink.

Bulk copper, which is used as existing metal wiring, is easy to oxidize, whereby conductivity thereof may be lowered and firing temperature thereof is high. In contrast, copper nanoparticles have a lower sintering temperature than bulk copper and are expected as a material capable of forming fine metal wiring on a substrate that is weak to heat, such as paper or plastic.

Since copper nanoparticles are easier to aggregate than other metal nanoparticles and have various particle sizes, however, it is difficult to compound uniform copper nanoparticles having a particle diameter of 10 nm or less that is particularly useful as an ink material.

In recent years, hydrazine has been used to homogeneously compound copper nanoparticles of 10 nm or less. However, hydrazine is known to be an extremely toxic substance that greatly erodes the skin, mucous membranes, enzymes, respiratory organs, and the like. A process for manufacturing copper nanoparticles that is not harmful to the environment and has a uniform dispersion has not been suggested.

In addition, it is known that copper nanoparticles with an average particle diameter of 10 nm or less have a large surface area and are easily oxidized. Most existing nanoparticle manufacturing patents do not disclose that copper nanoparticles are not oxidized.

A method of protecting copper nanoparticles that are easily oxidized includes the use of organic amine, which, however, must be stored at a low temperature (less than 10 degrees), whereby there is a limitation in terms of simplicity and convenience of transportation.

In view of the above, copper nanoparticles used for a low-temperature sinterable conductive copper ink material must satisfy the following requirements: (1) copper nanoparticles having an average particle diameter of 10 nm or less with a significant melting point drop, (2) copper nanoparticles, from which a protective agent for the same can be easily removed, (3) copper nanoparticles having no harmful substances generated in the process, (4) copper nanoparticles, oxidation of which is inhibited, (5) copper nanoparticles inexpensive in terms of industrialization, and (6) copper nanoparticles capable of being protected at room temperature.

However, copper nanoparticles that satisfy these requirements and processes for developing the same have not yet been proposed.

DISCLOSURE

Technical Problem

The inventors of the present application have studied the reducing power of an electride having a high electron concentration and a low work function, and have developed metal copper nanoparticles having an average diameter of about 5 nm from a reduction reaction on the surface of the electride through heat treatment of a two-valent organic copper compound. In addition, the inventors have found that the oxidation of copper is prevented by electrons of the electride, whereby the copper can be stored at room temperature.

Therefore, it is an object of the present invention to provide copper nanoparticles manufactured using the electride as a reducer and a method of manufacturing the same.

In addition, the inventors of the present application have studied the reducing power of a carbide-based electride having a high electron concentration and a low work function, and have developed metal copper nanoparticles having a size of about 10 nm from a reduction reaction on the surface of the carbide-based electride through heat treatment of a two-valent organic copper compound. In addition, the inventors have found that the oxidation of copper is prevented from electrons of the electride, whereby the copper can be stored at room temperature. In addition, the inventors have found that the oxidation of copper is prevented by electrons of the electride, whereby the copper can be stored at room temperature.

Therefore, it is another object of the present invention to provide copper nanoparticles manufactured using the carbide-based electride material, a method of manufacturing the same, and conductive ink using the compounded copper nanoparticles.

Technical Solution

In order to accomplish the above objects, the present invention provides a reducer for reducing an organic copper compound to copper nanoparticles, the reducer including at least one electride represented by Chemical Formulas 1 to 4 below:

M$_2$C(M: Y,Gd,Tb,Dy, or Ho)   <Chemical Formula 1>;

X$_2$N(X: Ca,Sr, or Ba)   <Chemical Formula 2>;

Hf$_2$Z(Z: S or Se)   <Chemical Formula 3>; and

C12A7(12CaO.7Al$_2$O$_3$)   <Chemical Formula 4>.

Here, the form of the electride may be a bulk, a single crystal, or a thin film, and the organic copper compound may be one selected from the group consisting of Cu(CH$_2$COO)$_2$, CuCl$_2$, Cu(NO$_3$)$_2$, and CuSO$_4$.

In addition, the present invention provides a method of manufacturing copper nanoparticles by reducing an organic copper compound using at least one electride represented by Chemical Formulas 1 to 4 below:

M$_2$C(M: Y,Gd,Tb,Dy, or Ho)   <Chemical Formula 1>;

X$_2$N(X: Ca,Sr, or Ba)   <Chemical Formula 2>;

Hf$_2$Z(Z: S or Se)   <Chemical Formula 3>; and

C12A7(12CaO.7Al$_2$O$_3$)   <Chemical Formula 4>.

Here, the form of the electride may be a bulk, a single crystal, or a thin film, and the organic copper compound may be one selected from the group consisting of Cu(CH$_2$COO)$_2$, CuCl$_2$, Cu(NO$_3$)$_2$, and CuSO$_4$.

In addition, the present invention provides:
a first step of mixing the organic copper compound and at least one electride represented by Chemical Formulas 1 to 4 below with each other to manufacture a mixture, M$_2$C(M: Y,Gd,Tb,Dy, or Ho)   <Chemical Formula 1>, X$_2$N(X: Ca,Sr, or Ba)   <Chemical Formula 2>, Hf$_2$Z(Z: S or Se)   <Chemical Formula 3>, and C12A7(12CaO.7Al$_2$O$_3$)   <Chemical Formula 4>; and It provides a method of manufacturing copper nanoparticles by reducing an organic copper compound including a second step of heat treating the mixture.

Here, the form of the electride may be a bulk, a single crystal, or a thin film.

The organic copper compound may be, but is not limited to, one selected from the group consisting of Cu(CH$_2$COO)$_2$, CuCl$_2$, Cu(NO$_3$)$_2$, and CuSO$_4$.

At the first step, the organic copper compound and the electride represented by Chemical Formula 1 above may be mixed with each other without any additional material; however, the organic copper compound and the electride may be mixed with a nonpolar solvent.

The nonpolar solvent may include, but is not limited to, a chain-based alkane or a ring-based alkane. The nonpolar solvent is used to homogeneously distribute the organic copper compound on the surface of the electride.

At the second step, the heat treatment may be performed in a vacuum atmosphere, and may be performed for 10 hours to 30 hours at a temperature of 100 to 200° C.

The electride, the organic copper compound, and the nonpolar solvent (heptane, hexane, pentane, or the like) may be mixed with each other, and a mixture thereof may be reduced in a low-temperature vacuum atmosphere of about 150° C. in order to manufacture copper nanoparticles.

The method may further include a third step of removing the electride using water or an alcohol-based solvent after the heat treatment to selectively separate only the copper nanoparticles from the surface of the electride.

The mixture may be sonicated in a nonpolar solvent to selectively separate the copper nanoparticles, and the nonpolar solvent used at the time of sonication may include, but is not limited to, a chain-based alkane or a ring-based alkane.

In addition, the present invention provides copper nanoparticles manufactured using the reducer according to the present invention.

Each of the copper nanoparticles may have a round shape with a diameter of 1 to 10 nm.

In addition, the present invention provides a protector for antioxidation, the protector including the copper nanoparticles according to the present invention.

Furthermore, the present invention provides conductive copper ink including the copper nanoparticles according to the present invention.

Advantageous Effects

Since the copper nanoparticles according to the present invention have an average particle diameter of about 5 nm, the melting point of the copper nanoparticles is remarkably low and the sintering temperature of the copper nanoparticles is low, whereby fine metal wiring may be formed on a substrate that is weak to heat, such as paper or plastic.

In addition, the copper nanoparticles according to the present invention are stably protected by electrons received from an electride, whereby oxidation of the copper nanoparticles may be prevented. In addition, since the electride, which functions as such a protective material, may be easily removed using water or an alcohol-based organic solvent, the copper nanoparticles may be preferably used as a copper nanoparticles ink material.

In addition, since the metal copper nanoparticles manufactured according to the present invention are manufactured in the state of being dispersed in the manufacturing process, dispersibility of the metal copper nanoparticles is excellent. Furthermore, since each of the metal copper nanoparticles has a size of about 5 nm, it is possible to form fine metal wiring at a lower temperature.

In addition, since hydrazine, which is a toxic substance, is not used in the manufacturing process according to the present invention, the present invention may be a great contribution to environmental and process safety. Furthermore, the simple manufacturing process is expected to significantly contribute to cost reduction.

In addition, since the effect of protecting the copper nanoparticles according to the present invention is stable at room temperature, stable movement and storage can be achieved.

DESCRIPTION OF DRAWINGS

FIG. 8 is an HRTEM photograph of copper particles (Example 1) having an average diameter of about 10 nm compounded using a carbide-based electride ($Y_2C$), wherein FIG. 1 shows that the distance between atoms is 0.21 nm and thus copper is not oxidized (the distance between copper oxide atoms being 0.25 nm).

BEST MODE

Figure 1:
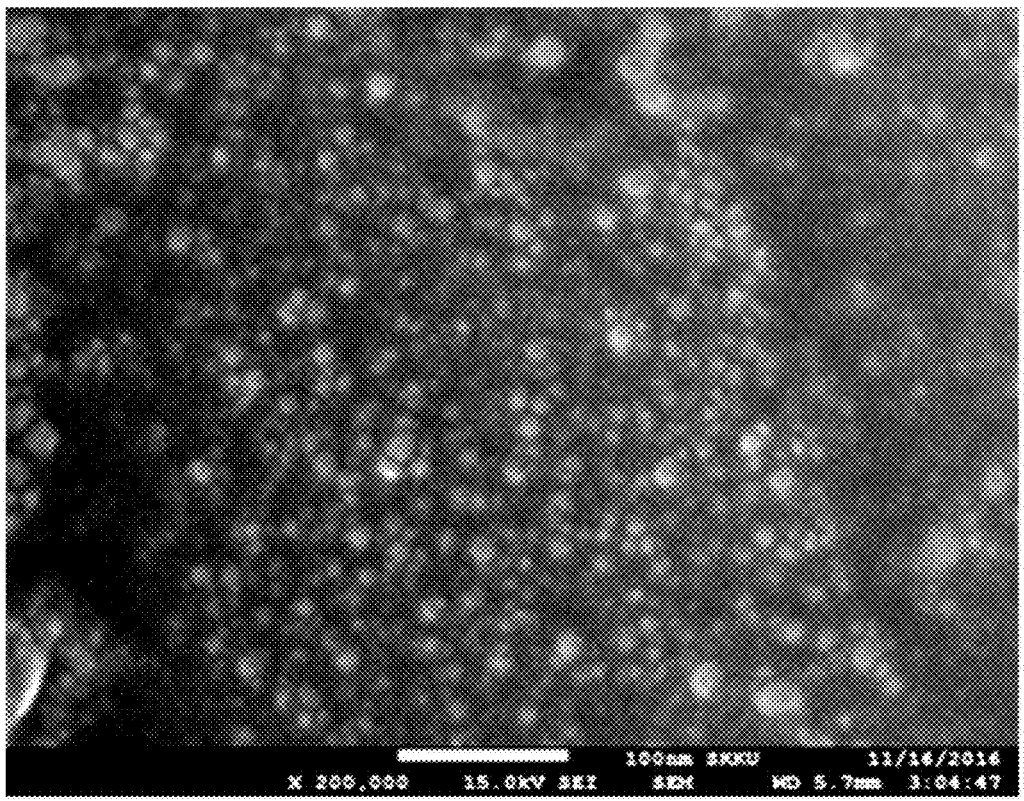
FIG. 1 is an SEM image of copper nanoparticles manufactured on the surface of $Ca_2N$, showing that the copper nanoparticles have been well manufactured without aggregation of the nanoparticles.
Figure 1:
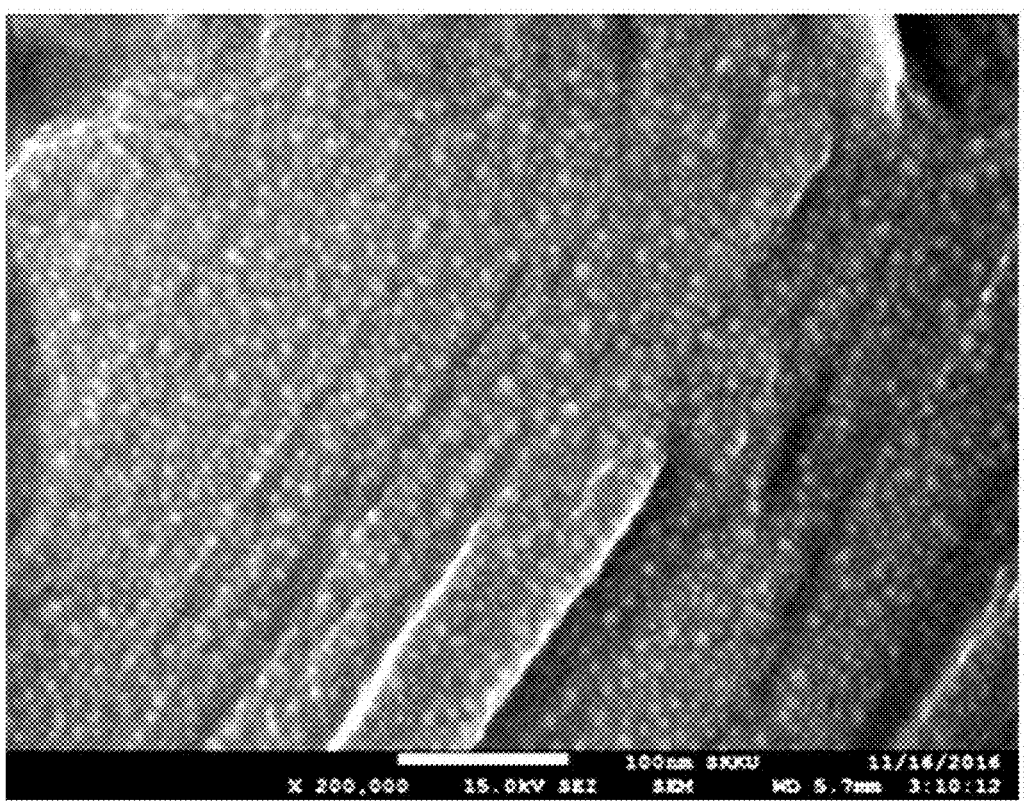

Advantages and features of the present invention, and methods of achieving the same will be apparent with reference to the embodiments described below in detail in conjunction with the accompanying drawings.

However, the present invention is not limited to the embodiments disclosed below and may be implemented in various forms.

The embodiments herein are provided to make the disclosure of the present invention complete and to fully convey the scope of the invention to those skilled in the art, and the present invention is defined by the scope of the claims.

In some embodiments, therefore, well-known components, well-known operations, and well-known techniques may be omitted from the detailed description of the present invention in order to avoid obscuring the present invention.

As used herein, singular forms include plural forms unless the context clearly dictates otherwise, and components and operations referred to as "comprises" (or "includes") do not exclude the presence or addition of one or more other components and operations.

Unless otherwise defined, all terms used in the present specification (including technical and scientific terms) may be used in a sense that can be commonly understood by those skilled in the art.

Hereinafter, the present invention will be described in detail.

The present invention provides a reducer for reducing an organic copper compound to copper nanoparticles, the reducer including at least one electride represented by Chemical Formulas 1 to 4 below:

$M_2C$(M: Y,Gd,Tb,Dy, or Ho) <Chemical Formula 1>;

$X_2N$(X: Ca,Sr, or Ba) <Chemical Formula 2>;

$Hf_2Z$(Z: S or Se) <Chemical Formula 3>; and $C12A7(12CaO.7Al_2O_3)$ <Chemical Formula 4>.

The form of the electride may be a bulk, a single crystal, or a thin film, and the bulk-shaped electride material may be a single crystal or a sinter manufactured through sintering.

The electride includes high-density interlayer electrons, and exhibits a great effect as a reducer due to low work function characteristics thereof.

The organic copper compound may be one selected from the group consisting of $Cu(CH_2COO)_2$, $CuCl_2$, $Cu(NO_3)_2$, and $CuSO_4$.

In addition, the present invention provides a method of manufacturing copper nanoparticles by reducing an organic copper compound using at least one electride represented by Chemical Formulas 1 to 4 below:

$M_2C$(M: Y,Gd,Tb,Dy, or Ho) <Chemical Formula 1>;

$X_2N$(X: Ca,Sr, or Ba) <Chemical Formula 2>;

$Hf_2Z$(Z: S or Se) <Chemical Formula 3>; and $C12A7(12CaO.7Al_2O_3)$ <Chemical Formula 4>.

The electride includes a localized high-density electron layer, and exhibits a great effect as a reducer due to low work function characteristics thereof. It is possible to manufacture uniform copper nanoparticles having a diameter of about 5 nm by adjusting the amount of organic copper and heat treatment conditions.

The electride material used to manufacture the copper nanoparticles may be powder or bulk-shaped. The bulk-shaped electride material may be a single crystal or a sinter manufactured through sintering.

$Cu(CH_2COO)_2$, $CuCl_2$, $Cu(NO_3)_2$, or $CuSO_4$ may be used as the organic copper compound; however, the present invention is not limited thereto.

When the organic copper compound and the electride are mixed with each other, the organic copper compound and the electride are mixed with each other such that 1 to 30 wt % of Cu is added based on mass of the electride. In the case in which the amount of copper is less than the above range, copper nanoparticles are not sufficiently generated, whereby it is difficult to obtain the copper nanoparticles. In the case in which the amount of copper is greater than the above range, organic copper is not decomposed, which is undesirable.

In addition, the present invention provides a method of manufacturing copper nanoparticles or a method of reducing an organic copper-based compound using an electride, the method including:

(a) a step of mixing a precursor material (an organic copper-based compound) with a nonpolar solvent to manufacture a mixture; and (b) a step of reducing the organic copper-based compound through heat treatment in a vacuum atmosphere to manufacture copper nanoparticles, wherein:

optionally, the method may further include (c) a step of separating the raw material obtained at step (b) from the electride.

Specifically, the method may include:

a first step of mixing an organic copper compound and at least one electride represented by Chemical Formulas 1 to 4 below with each other to manufacture a mixture, $M_2C$(M: Y,Gd,Tb,Dy, or Ho)  <Chemical Formula 1>, $X_2N$(X: Ca,Sr, or Ba)  <Chemical Formula 2>, $Hf_2Z$(Z: S or Se)  <Chemical Formula 3>, and $C12A7(12CaO.7Al_2O_3)$  <Chemical Formula 4>; and a second step of thermally treating the mixture in a vacuum atmosphere.

In addition, the method may further include a third step of removing the electride supports using water or an alcohol-based solvent after the heat treatment to selectively separate only the copper nanoparticles from the surface of the electride.

In the method, the first step is a step of mixing the organic copper compound and the electride with each other before a heat treatment process in order to manufacture a homogeneous mixture thereof.

At the first step, the form of the electride may be a bulk, a single crystal, or a thin film.

In addition, one selected from the group consisting of $Cu(CH_2COO)_2$, $CuCl_2$, $Cu(NO_3)_2$, and $CuSO_4$ may be used as the organic copper compound; however, the present invention is not limited thereto.

The organic copper compound and the electride represented by Chemical Formula 1 above may be mixed with each other without any additional material; however, the organic copper compound and the electride are preferably mixed with a nonpolar solvent. The nonpolar solvent is used to more homogeneously distribute the organic copper compound, which serves as a precursor, on the surface of the electride.

The nonpolar solvent may include, but is not limited to, a chain-based alkane or a ring-based alkane. The nonpolar solvent is used to homogeneously distribute the organic copper compound on the surface of the electride.

The organic copper compound and the electride represented by Chemical Formula 1 above are preferably mixed with the nonpolar solvent and evenly stirred until all of the nonpolar solvent evaporates.

The organic copper may be used in an amount of 2.5 wt % to 10 wt % based on the weight of the electride. In the case in which less than 2.5 wt % of the organic copper is used, it is difficult to obtain copper nanoparticles. In the case in which more than 10 wt % of the organic copper is used, the organic copper remains.

It is preferable to add a nonpolar organic solvent to the mixture, and a chain-based alkane or a ring-based alkane is preferably used as the nonpolar organic solvent.

When 300 mg of the electride is used, the appropriate amount of the nonpolar solvent is 3 to 7 ml. In the case in which less than 3 ml of the nonpolar solvent is used, there is a risk of ignition. In the case in which more than 7 ml of the nonpolar solvent is used, the mixture is not uniformly mixed.

In an embodiment of the present invention, an electride and an organic copper compound raw material were put into a mortar and then a nonpolar solvent is put into the mortar, and then a mixture thereof was uniformly stirred in one direction until all of the solvent evaporated.

In the method, the second step is a step of manufacturing nanoparticles by reducing two-valent copper combined with the organic copper compound to metal copper by heat treatment in a vacuum atmosphere using the reducing ability of the electride.

Specifically, the mixture of the raw materials manufactured in the first step is put into a silica tube connected to a pump facility that is capable of continuously generating a vacuum during heat treatment thereof in order to manufacture copper nanoparticles through the heat treatment process.

The heat treatment is preferably performed for 10 hours to 30 hours at a temperature of 100 to 200° C., more preferably for 12 to 24 hours at a temperature of about 150° C. In the case in which the heat treatment time is less than the above range, the organic copper compound is not sufficiently decomposed and thus remains. In the case in which the heat treatment time exceeds the above range, oxidation of the electride may be promoted, which is undesirable.

The optimal heat treatment temperature is 150° C. In the case in which the heat treatment temperature is less than 100° C., organic copper remains. In the case in which the heat treatment temperature is 200° C. or higher, the electride is decomposed into a phase of $M_3N_2$, which is not suitable for manufacture.

The heat treatment is preferably performed in a vacuum atmosphere.

In an embodiment of the present invention, the mixture of the raw materials manufactured in the first step was put into a silica tube connected to a pump facility which is capable of continuously generating a vacuum during the heat treatment thereof in order to manufacture copper nanoparticles through the heat treatment process.

Here, it is possible to manufacture uniform copper nanoparticles having a diameter of about 5 nm by adjusting the amount of organic copper and heat treatment conditions.

In an embodiment of the present invention, it was confirmed that the size of each of the copper nanoparticles manufactured on the surface of the electride represented by Chemical Formula 1 above may be adjusted to a diameter ranging from several nm to several hundred nm through adjustment of the heat treatment conditions.

In the method, the third step is a step of separating the copper nanoparticles manufactured using the reducing ability of the electride from the electride.

After the heat treatment, a step of separating the copper nanoparticles may be further performed. For example, the mixture thermally treated at the second step may be sonicated in a nonpolar solvent to selectively separate the copper nanoparticles, or the electride may be melted using alcohol or water to separate the copper nanoparticles present on the surface of the electrode, whereby only the copper nanoparticles may be selectively separated.

In an embodiment of the present invention, the electride was melted using alcohol or water to selectively separate the copper nanoparticles from the surface of the electrode.

In addition, the present invention provides copper nanoparticles manufactured using the reducer according to the present invention.

The size of each of the copper nanoparticles may be adjusted to a diameter ranging from several nm to several hundred nm through adjustment of heat treatment conditions, and in particular each of the copper nanoparticles preferably has a uniformly round shape with a diameter of 1 to 10 nm.

In addition, the present invention provides conductive copper ink including the copper nanoparticles according to the present invention.

Since each of the copper nanoparticles has a small particle size and exhibits high dispersibility, the copper nanoparticles may be usefully used as a conductive copper ink material.

Hereinafter, the present invention will be described in more detail using Examples and Comparative Examples.

<Example 1> Copper Nanoparticles Manufactured Using Electride $Ca_2N$ and TEM and SEM Analyses Thereof 43 mg of copper acetate, 5 ml of heptane, and 300 mg of $Ca_2N$ were sufficiently mixed with each other to form a mixture for heat treatment. A finely ground compound of the organic copper and the electride was put into a silica tube in a powder form, and the silica tube was connected to a vacuum tube. Subsequently, thermal decomposition was performed for 12 hours in a vacuum atmosphere of 150° C.

As can be confirmed from an SEM image shown in FIG. 1, it can be seen that the manufactured raw material was formed in the state in which copper nanoparticles were uniformly distributed on the surface of $Ca_2N$.

For precise analysis of the copper nanoparticles compounded on the surface of $Ca_2N$, the copper nanoparticles were dispersed in heptane, and transmission electron microscope (TEM) measurement was performed using a Si TEM grid.

Figure 2:
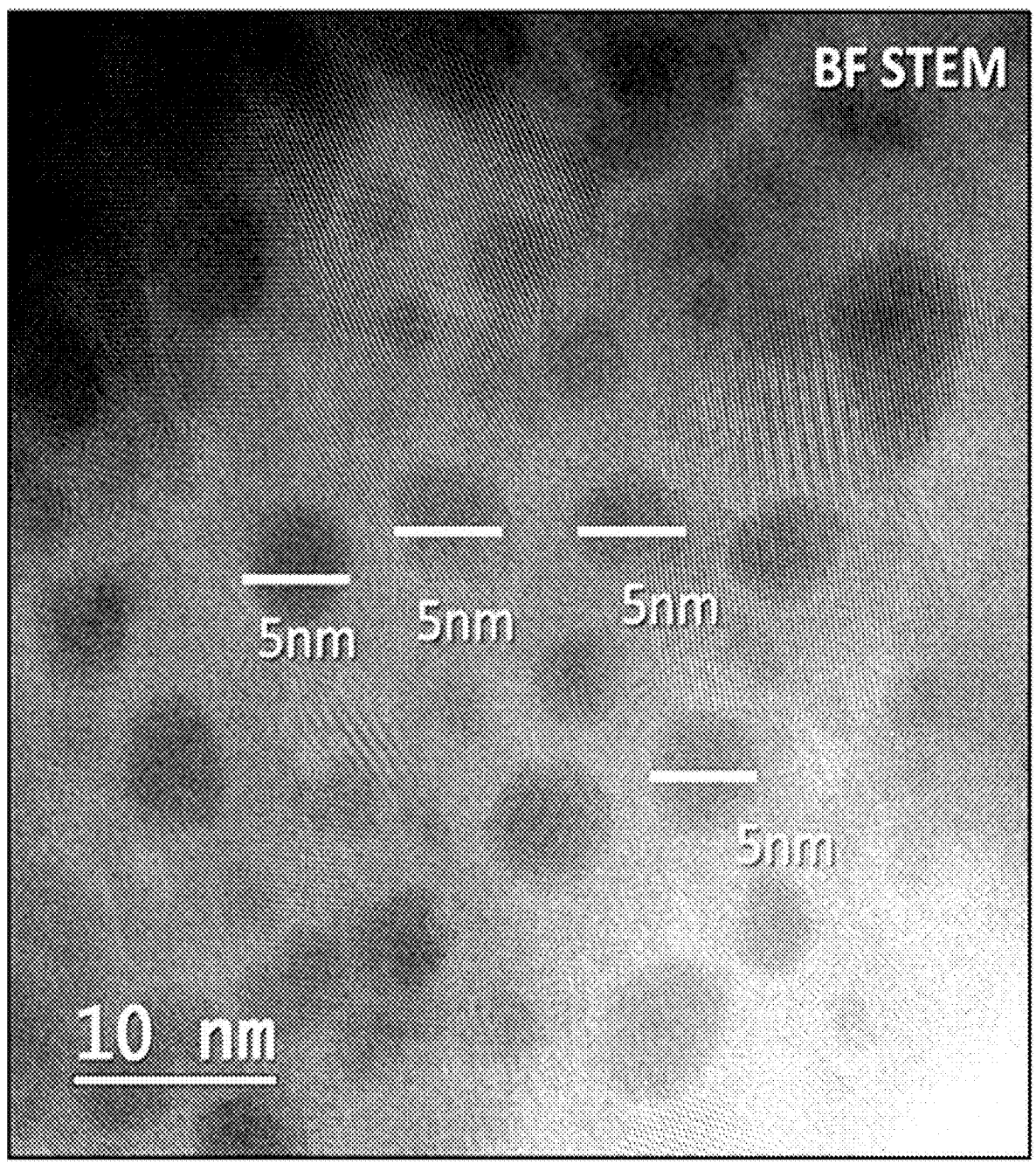
FIG. 2 is a BFSTEM image of copper nanoparticles manufactured on the surface of $Ca_2N$, showing that the copper nanoparticles have been uniformly manufactured in the state in which the average size (the average diameter) of the copper nanoparticles is about 5 nm.
Figure 3:
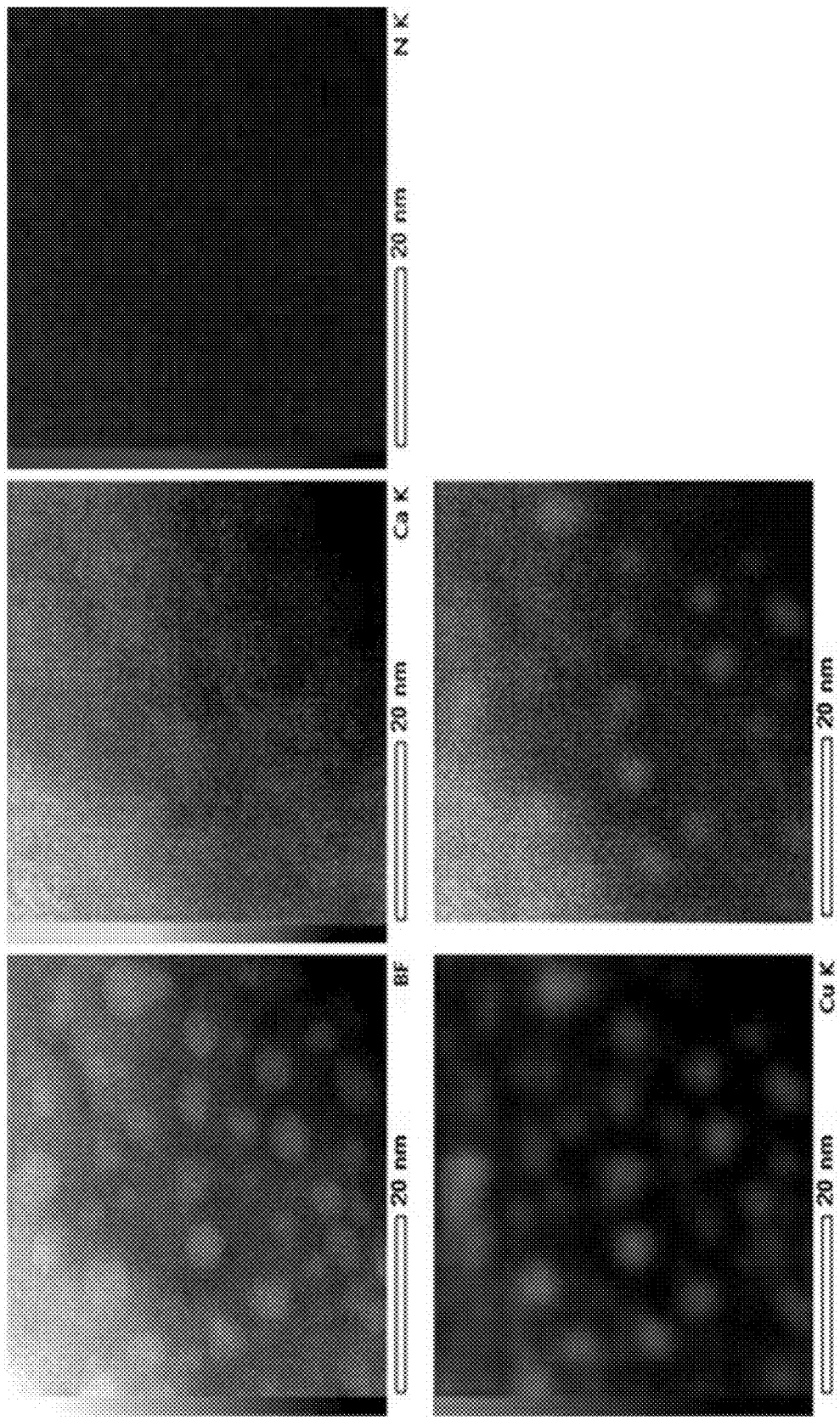
FIG. 3 is a view showing copper nanoparticles manufactured on the surface of $Ca_2N$, proving that the nanoparticles are made of copper through TEM-EDS analysis of the nanoparticles.

As can be seen from a Bright-Field Scanning TEM (BFSTEM) image shown in FIG. 2, the copper nanoparticles were well manufactured on the surface of $Ca_2N$ in the state of having a uniformly round shape with an average diameter of 5 nm. TEM-EDS analysis of FIG. 3 proves that the nanoparticles formed on the surface of $Ca_2N$ are copper nanoparticles.

<Comparative Example 1> Manufacture of Copper Nanoparticles Using Hydrazine

A previously reported method used a powerful reducer called hydrazine to manufacture copper nanoparticles and used amine as a protective layer thereof.

Figure 7:
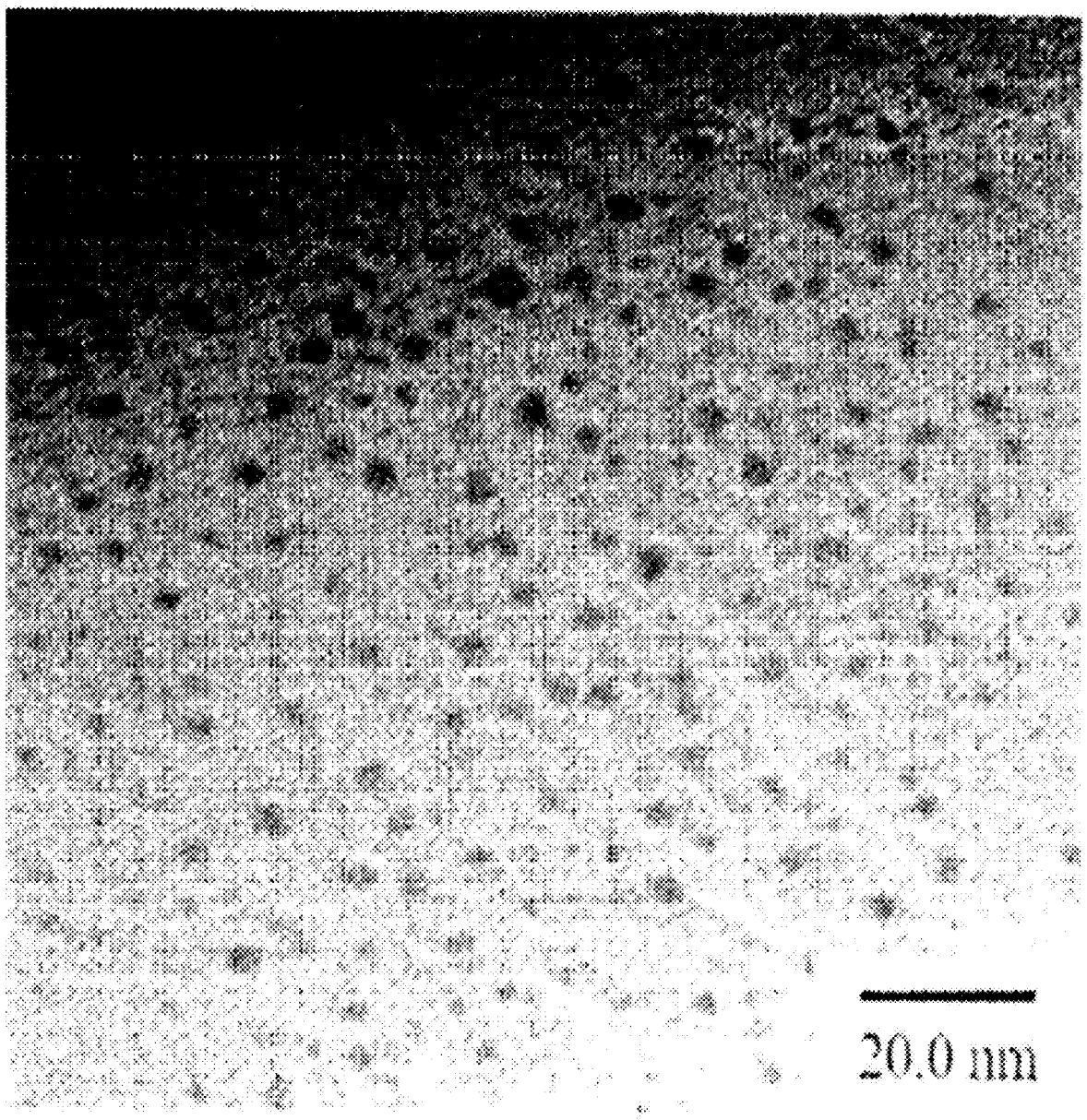
FIG. 7 is an SEM image of copper nanoparticles manufactured using hydrazine.

As shown in FIG. 7, uniform copper nanoparticles were manufactured, but hydrazine, which may permeate the human body and is thus very harmful, was used in the manufacturing process, and amine was used for storage. Since amines easily form salts with water and have strong hydrophilicity, long-term storage may cause amines to contain water and oxidize, and salts may precipitate.

<Example 2> Evaluation of Antioxidation on Surface of $Ca_2N$

As the size of the copper nanoparticles decreases, the surface area to volume ratio thereof increases, and the copper nanoparticles tend to be easily oxidized.

However, the copper nanoparticles manufactured according to the present invention are protected by an electride support exhibiting an excellent electron provision ability and reactivity and having an advantage of competitive reaction in an oxidation reaction, whereby the copper nanoparticles are not easily oxidized.

Figure 4:
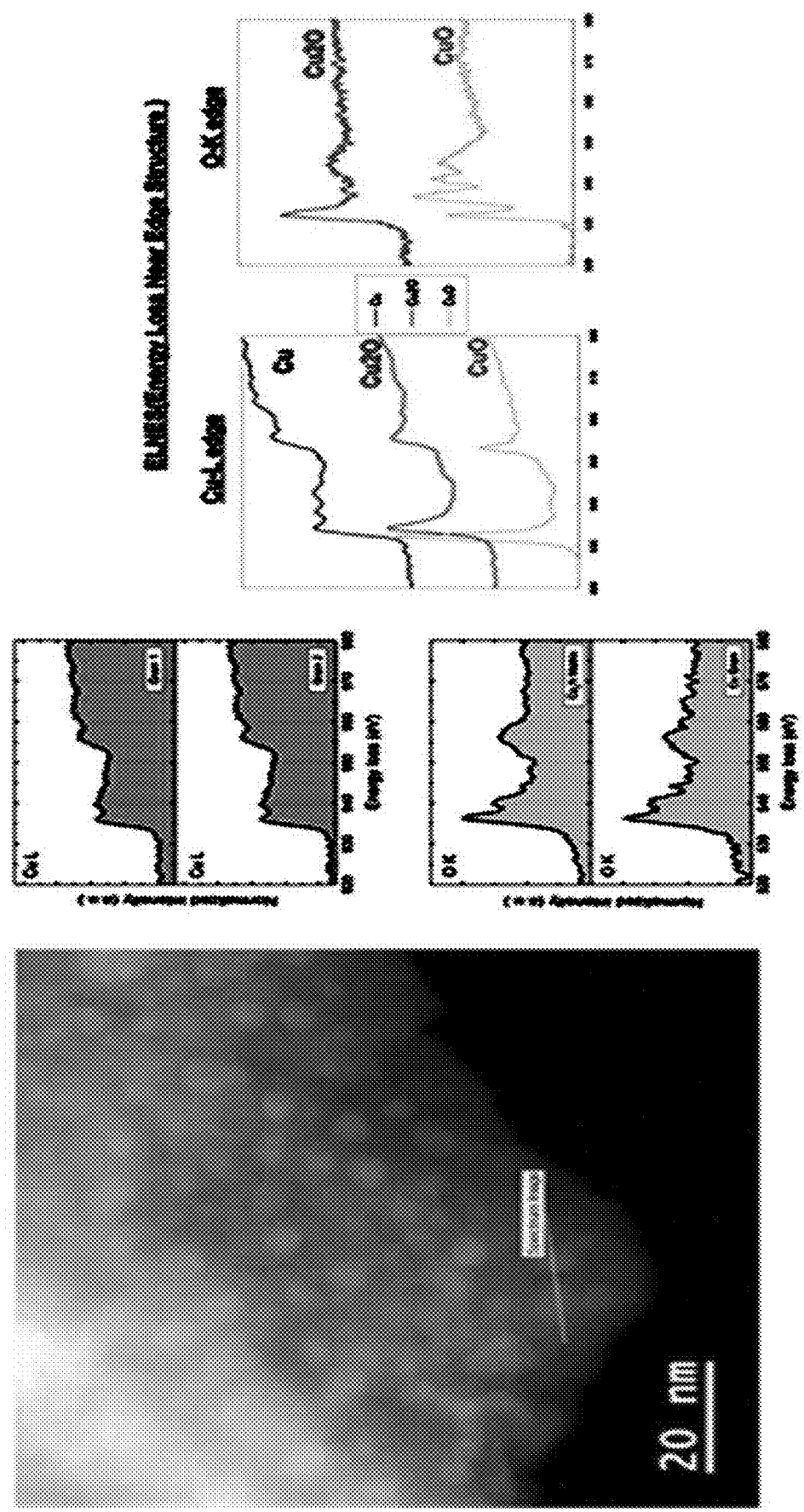
FIG. 4 is a view showing copper nanoparticles, oxidation of which is prevented by electron transfer ability of $Ca_2N$, proving that the nanoparticles are made of zero-valent copper through an EELS spectrum.
Figure 5:
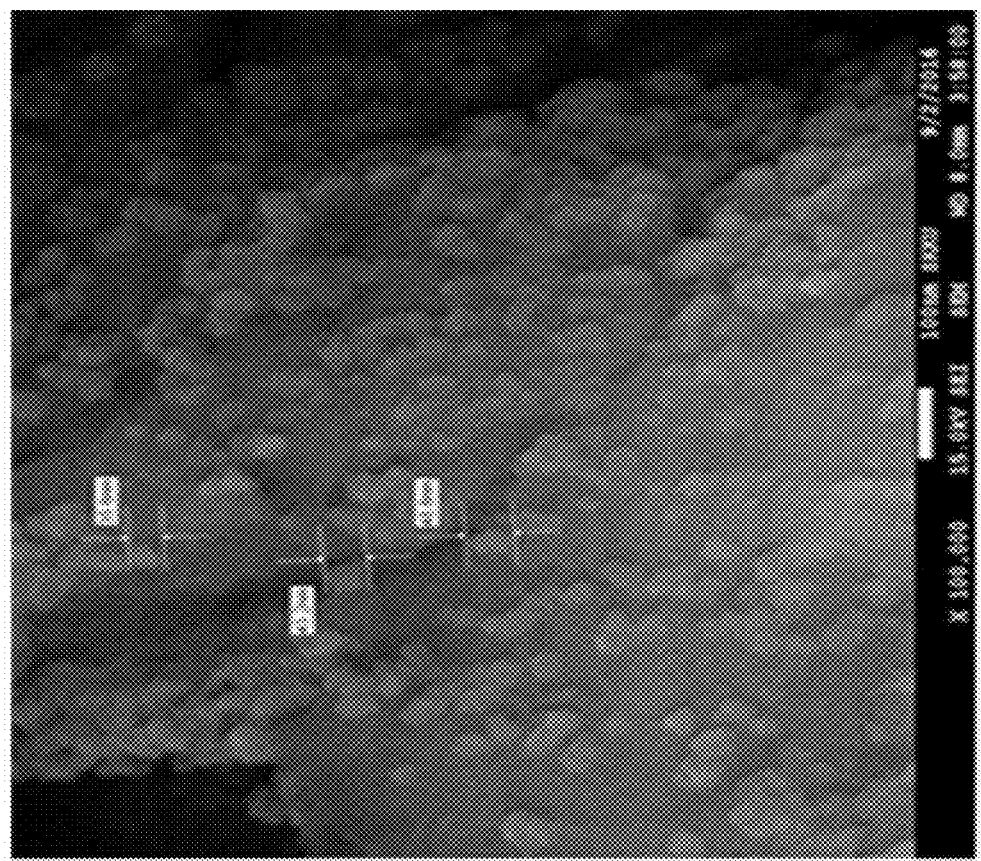
FIG. 5 is a view showing copper nanoparticles having a size of several tens of nm manufactured through adjustment of a heat treatment method.
Figure 5:
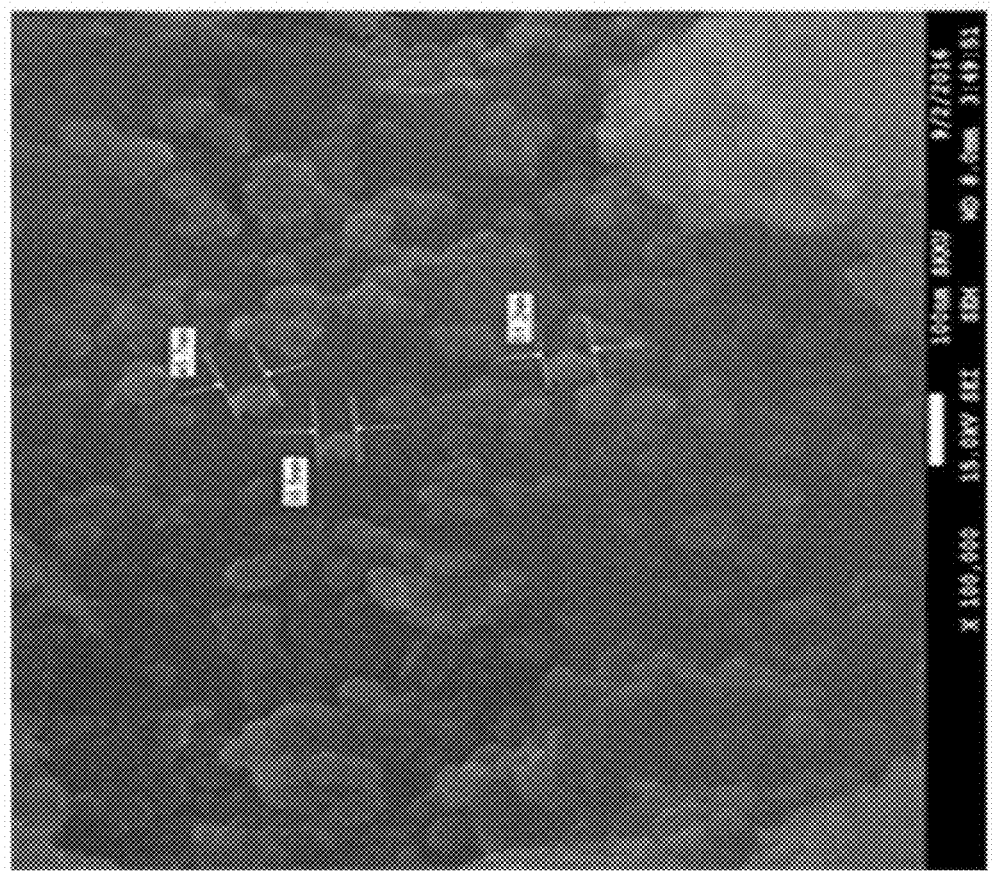
Figure 6:
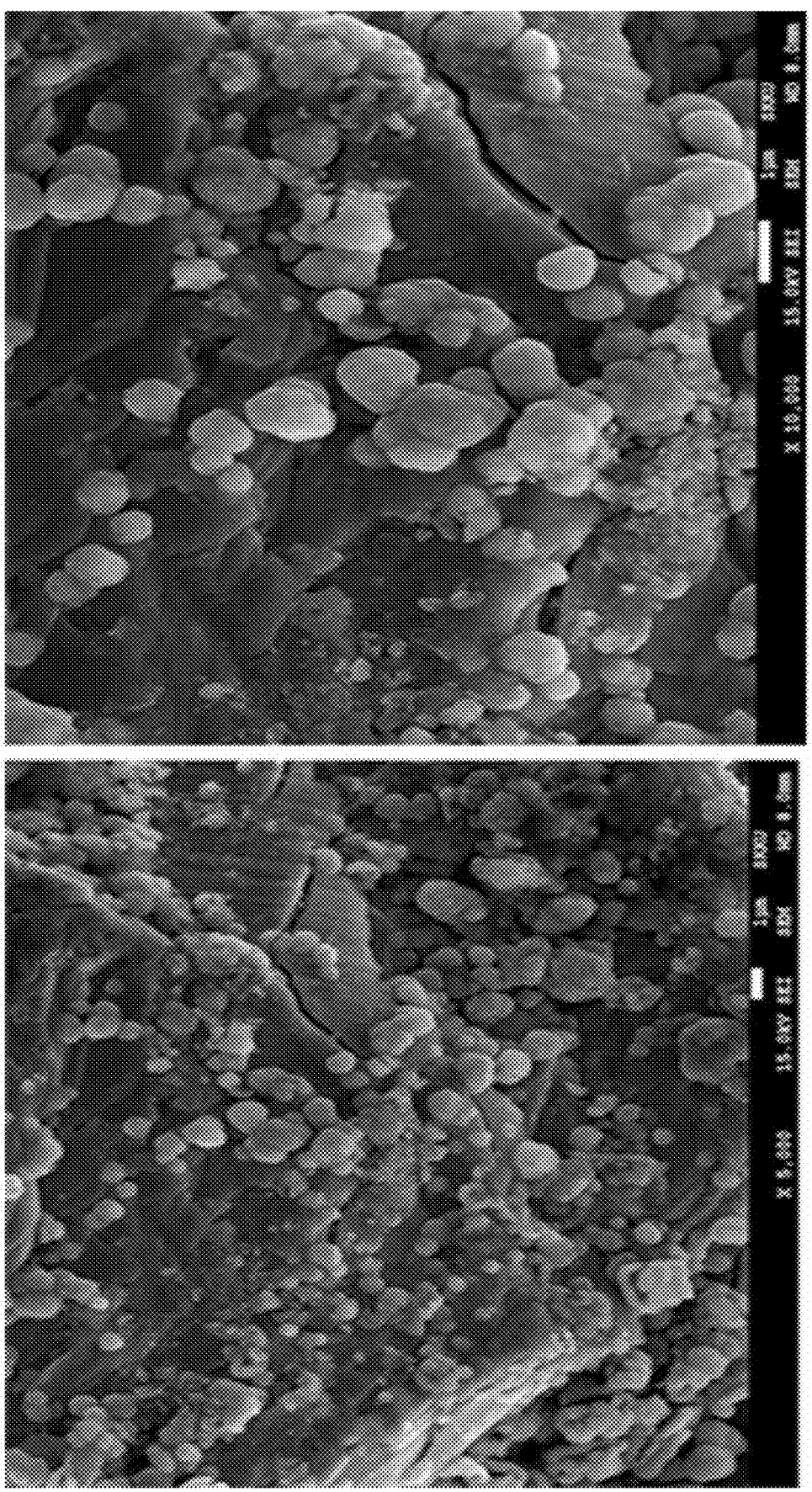
FIG. 6 is a view showing copper nanoparticles each having a size of several hundred nm manufactured through adjustment of a heat treatment method.

As can be confirmed from FIG. 4, copper identified by TEM-EELS was a zero-valent metal, and oxidation thereof was prevented by the electride.

<Example 3> Copper Nanoparticles Manufactured Using Electride $Y_2C$ and TEM and SEM Analyses Thereof Copper acetate and $Y_2C$ were ground and mixed with each other, and a mixture thereof was put into a silica tube in a powder form, and the silica tube was connected to a vacuum tube. Subsequently, thermal decomposition was performed for 12 hours in a vacuum atmosphere of 150° C. When the copper acetate and $Y_2C$ were mixed with each other, the copper acetate was mixed so as to include 500 mg of $Y_2C$ and 10 wt % of Cu based on $Y_2C$.

Figure 9:
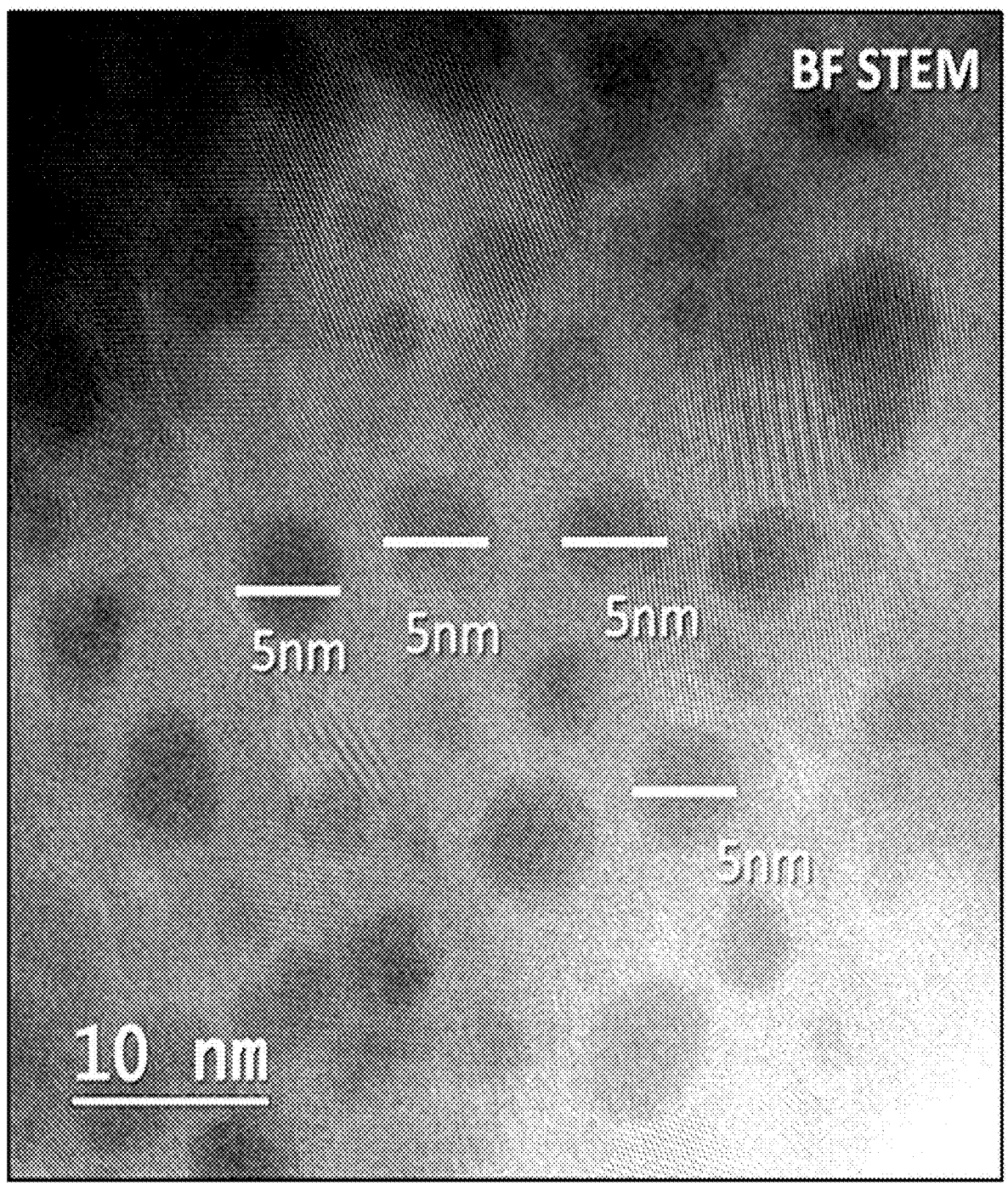
FIG. 9 is an SEM photograph of nanoparticles (Example 1 and Example 2) compound on an $Y_2C$ electrode and a $Gd_2C$ electrode.

As can be confirmed from an SEM image shown in FIG. 9, it can be seen the manufactured raw material was formed in the state in which the copper nanoparticles were well compounded while having a uniform size.

Figure 8:
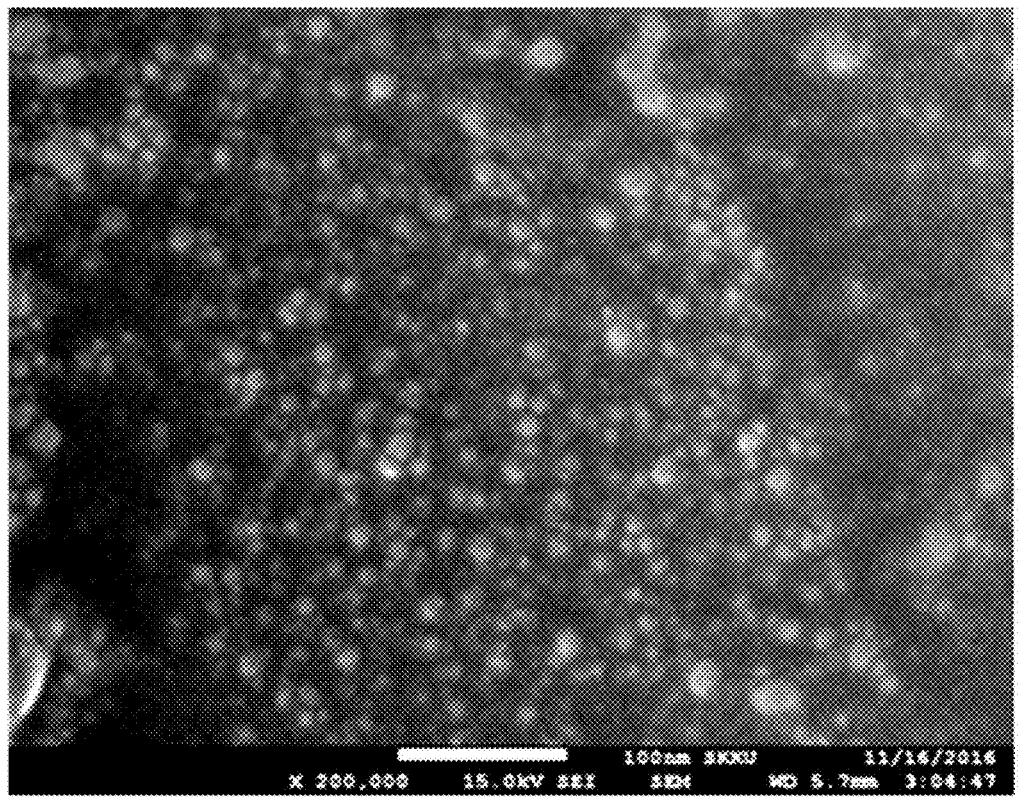
Figure 8:
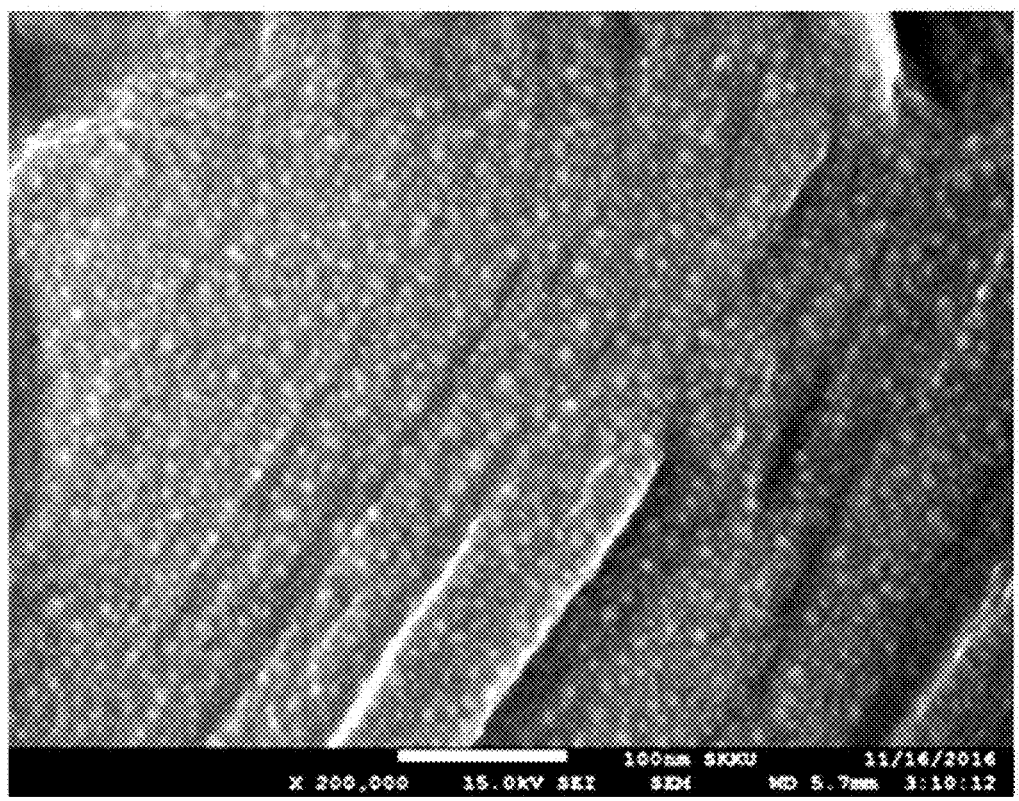

For precise analysis of the copper nanoparticles compounded on the surface of $Y_2C$, the copper nanoparticles were dispersed in heptane, and TEM measurement was performed using a Si TEM grid. As can be seen from an HRTEM image shown in FIG. 8, the copper nanoparticles were well manufactured on the surface of $Ca_2N$ in the state of having a uniformly round shape with an average diameter of 10 nm.

<Example 4> Copper Nanoparticles Manufactured Using Electride $Gd_2C$ and TEM and SEM Analyses Thereof Copper acetate and $Gd_2C$ were ground and mixed with each other, and a mixture thereof was put into a silica tube in a powder form, and the silica tube was connected to a vacuum tube. Subsequently, thermal decomposition was performed for 12 hours in a vacuum atmosphere of 150° C. When the copper acetate and $Gd_2C$ were mixed with each other, the copper acetate was mixed so as to include 500 mg of $Gd_2C$ and 10 wt % of Cu based on $Gd_2C$.

As can be confirmed from the SEM image shown in FIG. 9, it can be seen that the manufactured raw material was formed in the state in which the copper nanoparticles were well compounded while having a uniform size.

Figure 10:
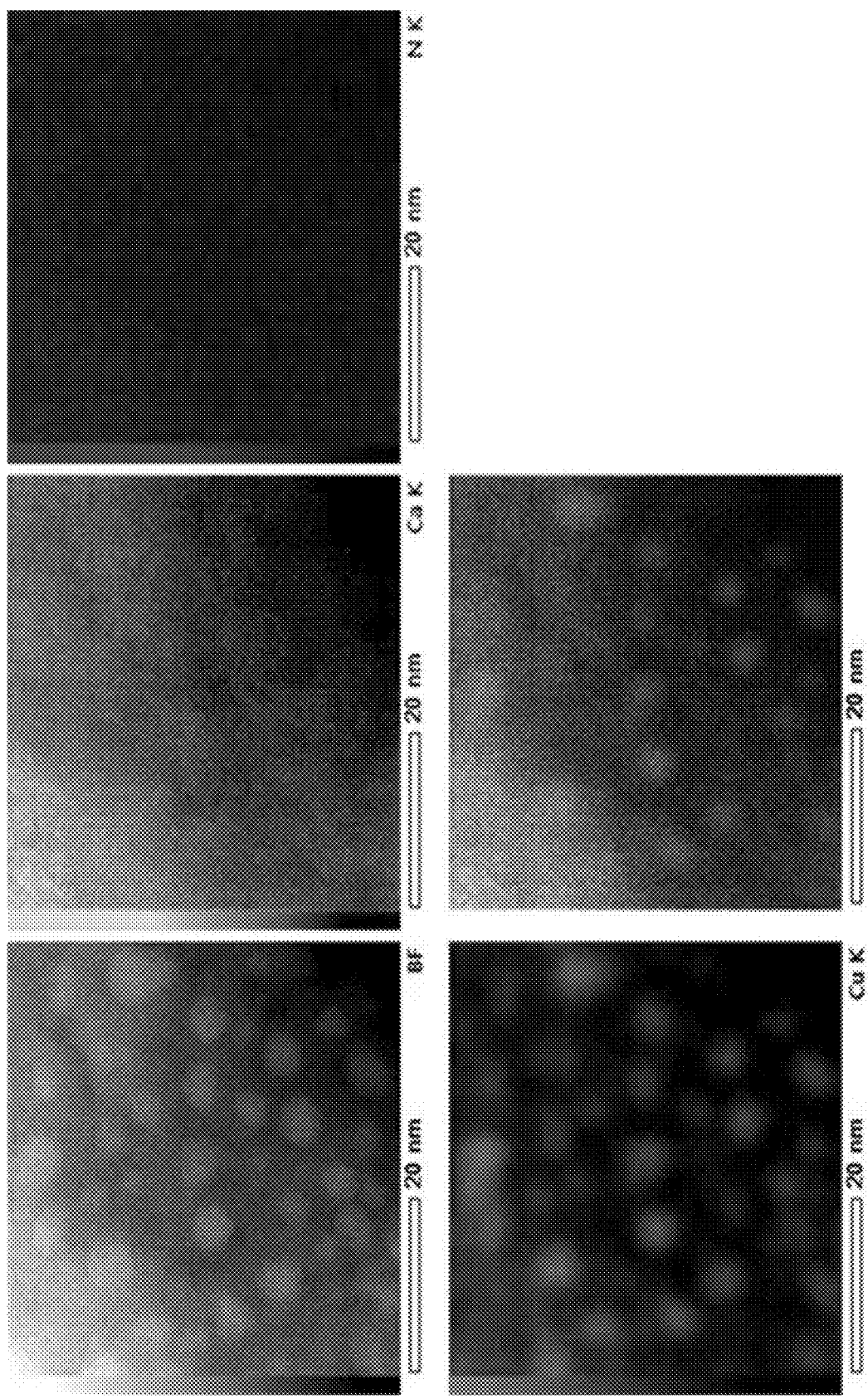
FIG. 10 is a view showing copper nanoparticles (Example 2) manufactured on the surface of $Gd_2C$, proving that the nanoparticles are made of copper through TEM-EDS analysis of the nanoparticles.

For precise analysis of the copper nanoparticles compounded on the surface of $Gd_2C$, the copper nanoparticles were dispersed in heptane, and TEM measurement was performed using a Si TEM grid. As can be seen from an STEM image shown in FIG. 11, the copper nanoparticles were well manufactured on the surface of $Gd_2C$ in the state of having a uniformly round shape with an average diameter of 10 to 20 nm. TEM-EDS analysis of FIG. 10 proves that the nanoparticles formed on the surface of $Gd_2C$ are copper nanoparticles.

<Comparative Example 2> Manufacture of Copper Nanoparticles Using Hydrazine

The previously reported method used a powerful reducer called hydrazine to manufacture copper nanoparticles and used amine as a protective layer thereof.

As shown in FIG. 7, uniform copper nanoparticles were manufactured, but hydrazine, which may permeate the human body and is thus very harmful, was used in the manufacturing process, and amine was used for storage. Since amines easily form salts with water and have strong hydrophilicity, long-term storage may cause amines to contain water and oxidize, and salts may precipitate.

<Example 5> Evaluation of Antioxidation on Surface of $Gd_2C$

As the size of the copper nanoparticles decreases, the surface area to volume ratio thereof increases, and the copper nanoparticles tend to be easily oxidized. However, the copper nanoparticles manufactured according to the present invention are protected by an electride support exhibiting an excellent electron provision ability and reactivity and having an advantage of competitive reaction in an oxidation reaction, whereby the copper nanoparticles are not easily oxidized.

Figure 11:
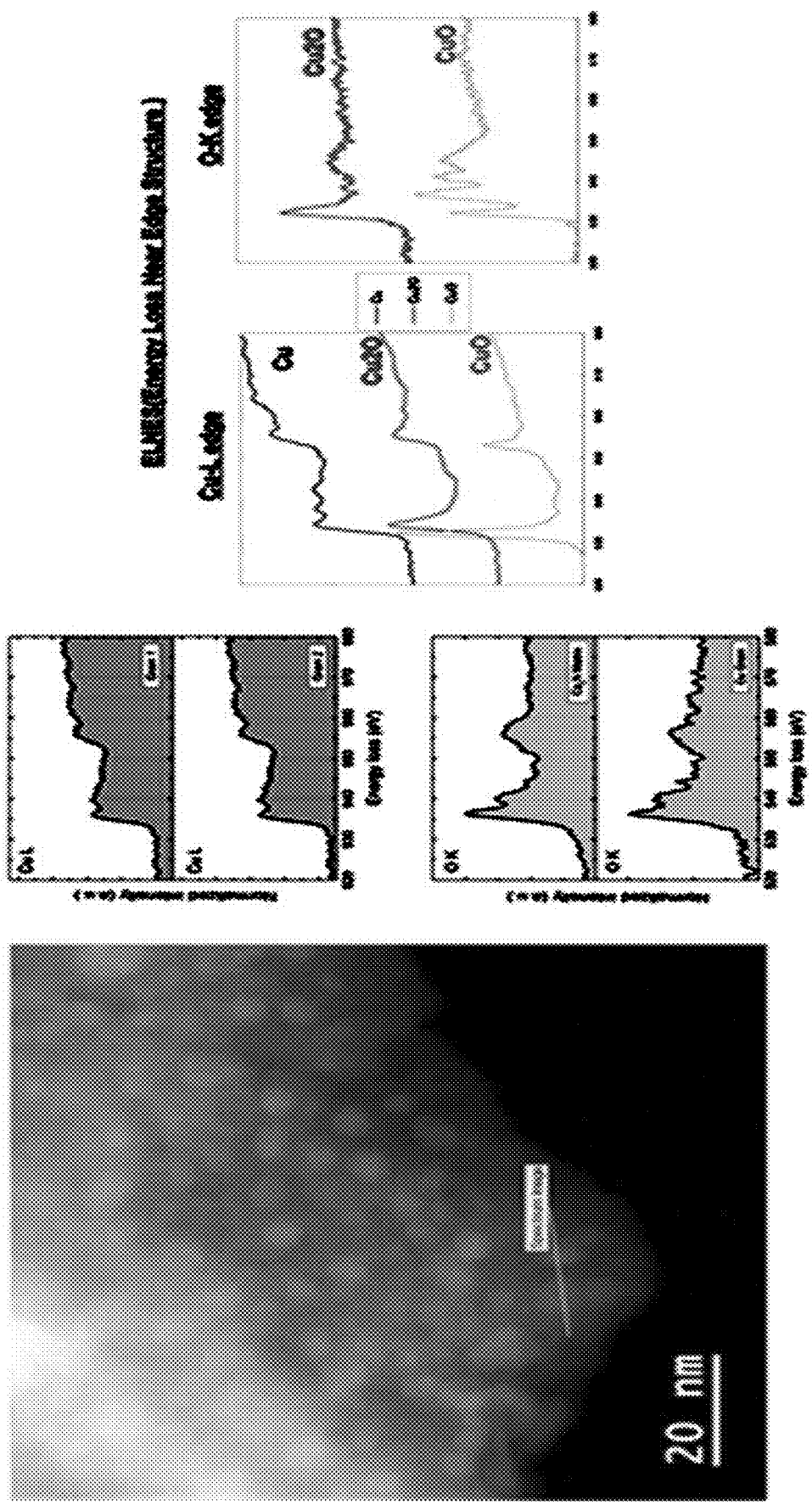
FIG. 11 is an SEM image of copper nanoparticles (Example 2) manufactured on the surface of $Gd_2C$, oxidation of the copper nanoparticles being prevented by electron transfer ability of $Gd_2C$, proving that the nanoparticles are made of zero-valent copper through an EELS spectrum.
Figure 12:
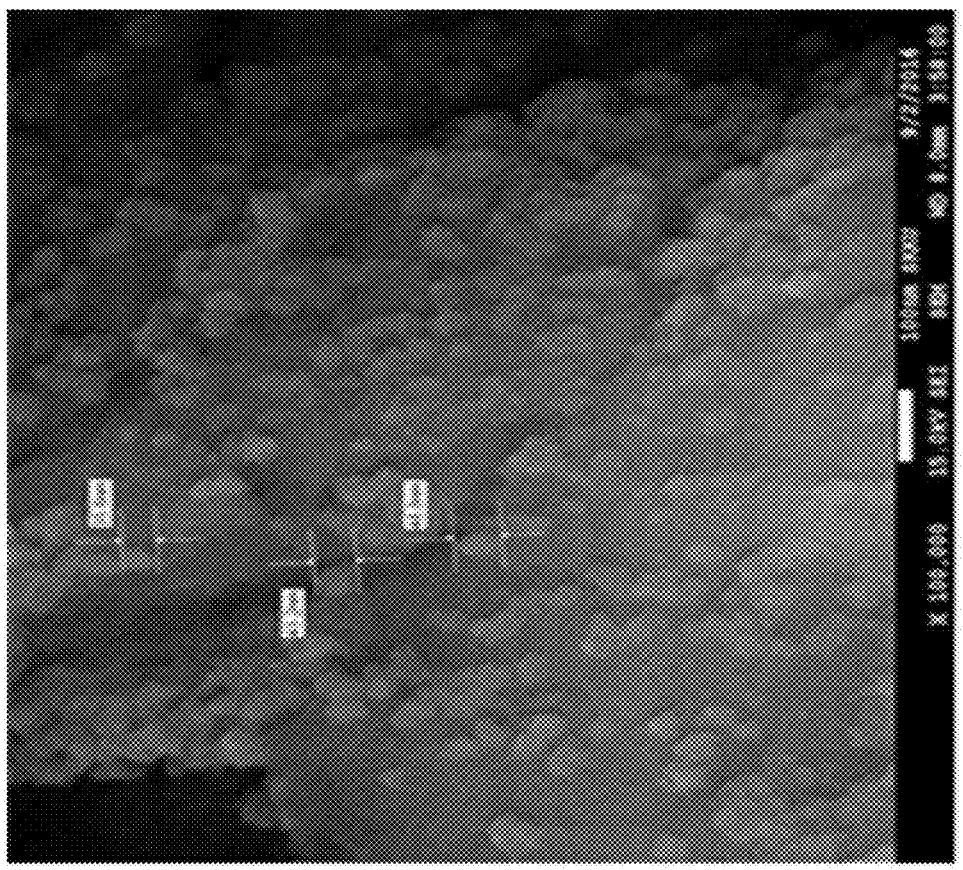
FIG. 12 is a view showing that an organic copper precursor has been completely decomposed even through low-temperature sintering, confirmed through XRD measurement.
Figure 12:
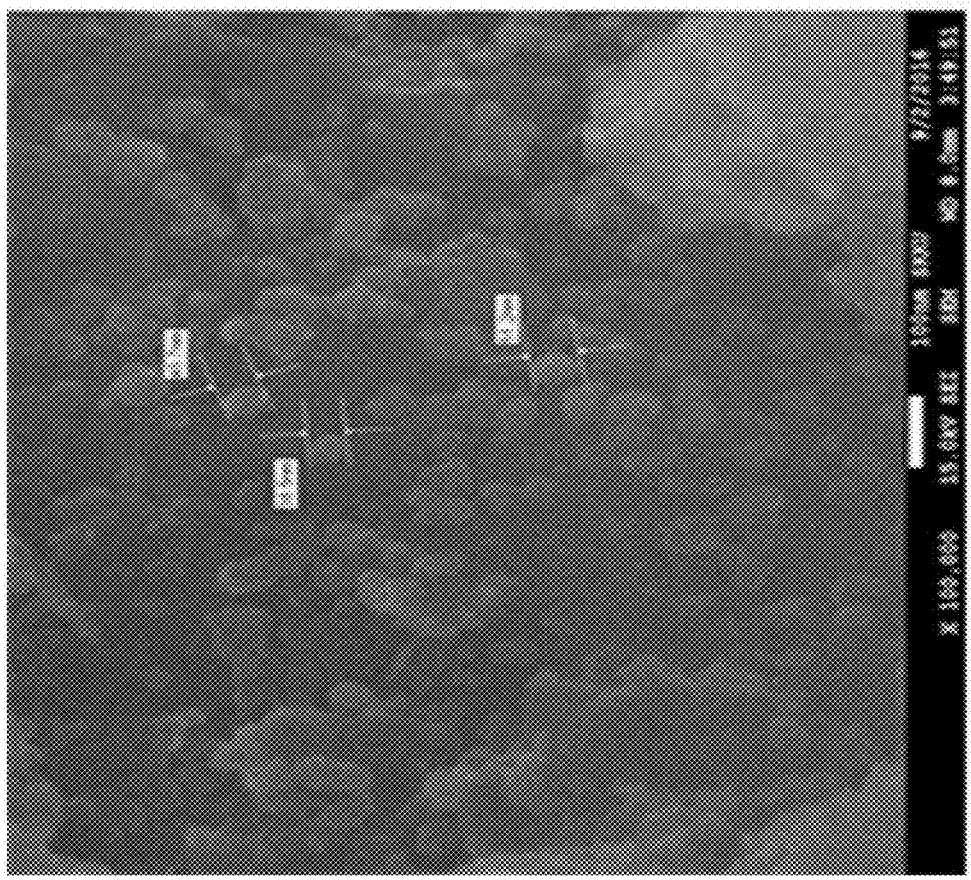

As can be confirmed from FIG. 11, copper identified by TEM-EELS was a zero-valent metal, and oxidation thereof was prevented by the electride.

The above description is merely illustrative of the technical idea of the present invention, and those skilled in the art to which the present invention pertains may make various modifications and alterations without departing from the essential characteristics of the present invention. Therefore, the embodiments disclosed in the present invention are not intended to limit the technical idea of the present invention but to describe the present invention, and the scope of the technical idea of the present invention is not limited by these embodiments. The protection scope of the present invention should be interpreted by the following claims, and all technical ideas within the equivalent scope should be interpreted as being included in the scope of the present invention.

The invention claimed is:

1. A method of manufacturing oxidation protected copper nanoparticles, the method comprising:
   reducing a two-valent copper compound with at least one electride, as a reducing agent, represented by Chemical Formulas 1 to 4 below:

$M_2C$ (M: Y,Gd,Tb,Dy, or Ho)     <Chemical Formula 1>;

$X_2N$ (X: Ca,Sr, or Ba)     <Chemical Formula 2>;

$Hf_2Z$ (Z: S or Se)     <Chemical Formula 3>; and $C12A7$ ($12CaO\cdot7Al_2O_3$)     <Chemical Formula 4>, and wherein the two-valent copper compound is one selected from a group consisting of $Cu(CH_2COO)_2$, $Cu(NO_3)_2$, $CuCl_2$ and $CuSO_4$; and
   controlling an average diameter of copper nanoparticles to within 5-10 nm by adjusting a wt % of the two-valent copper compound based on mass of the electride,
   wherein the two-valent copper compound is 2.5 wt % to 10 wt % based on mass of the electride.

2. The method according to claim 1, wherein a form of the electride is a bulk, a single crystal, or a film.

3. The method according to claim 1, wherein the two-valent copper compound is one selected from a group consisting of $Cu(CH_2COO)_2$, $Cu(NO_3)_2$, and $CuSO_4$.

4. The method according to claim 1, wherein the at least one electride is represented by Chemical Formula 1 or Chemical Formula 3.

5. The method according to claim 1, wherein the obtained copper nanoparticles comprise zero-valent copper.

6. The method according to claim 1, wherein the obtained copper nanoparticles are protected from oxidation when stored at room temperature by electrons of the at least one electride.

7. A method of manufacturing copper nanoparticles by reducing a two-valent copper compound, the method comprising:
   a first step of mixing the two-valent copper compound and at least one electride represented by Chemical Formulas 1 to 4 below to obtain a mixture, $M_2C$ (M: Y,Gd,Tb,Dy, or Ho)     <Chemical Formula 1>, $X_2N$ (X: Ca,Sr, or Ba)     <Chemical Formula 2>, $Hf_2Z$ (Z: S or Se)     <Chemical Formula 3>, and $C12A7$ ($12CaO\cdot7Al_2O_3$)     <Chemical Formula 4>, and wherein the two-valent copper compound is one selected from a group consisting of $Cu(CH_2COO)_2$, $Cu(NO_3)_2$, $CuCl_2$ and $CuSO_4$; and
   a second step of thermally treating the mixture to obtain copper nanoparticles,
   wherein an average diameter of the copper nanoparticles is controlled to be within 5-10 nm; and
   a third step of removing the electride using sonication or melting with water or an alcohol solvent after the thermal treatment to selectively separate only the copper nanoparticles from a surface of the electride.

8. The method according to claim 7, wherein, at the first step, a nonpolar organic solvent is added to the mixture.

9. The method according to claim 8, wherein the nonpolar organic solvent comprises a linear, branched, or cyclic alkane.

10. The method according to claim 7, wherein, at the second step, the heat treatment is performed for 10 hours to 30 hours at a temperature of 100 to 200° C.

11. The method according to claim 7, wherein the mixing is performed such that a wt % of the two-valent copper compound is 2.5 wt % to 10 wt % based on mass of the at least one electride.

* * * * *